Nov. 8, 1966          D. C. T. SHANG          3,283,590

TELEMETRIC ACCELEROMETER

Filed June 17, 1964

DAVID C.T. SHANG
*INVENTOR.*

BY

Thomas W. Kennedy
ATTORNEY

United States Patent Office 3,283,590
Patented Nov. 8, 1966

3,283,590
TELEMETRIC ACCELEROMETER
David C. T. Shang, Owego, N.Y., assignor to General Precision Inc., Little Falls, N.J., a corporation of Delaware
Filed June 17, 1964, Ser. No. 375,730
12 Claims. (Cl. 73—517)

The present invention relates to accelerometers, and more particularly to tri-axial accelerometers, which feed output signals to a telemetric transmitter.

Prior art accelerometers with telemetric transmitters have a conventional accelerometer unit including a frame or support structure mounting a relatively displaceable seismic or proof mass. A separate telemetric transmitter is electrically connected to the accelerometer unit. The sensitivity of such a telemetric accelerometer is relatively low because its ratio of effective seismic mass to total instrument weight is relatively low. Moreover, the space required for telemetry components renders the overall system undesirably bulky.

Accordingly it is one object of the present invention to provide a telemetric accelerometer of increased sensitivity.

It is another object of the invention to minimize the size of telemetric accelerometers without decreasing sensitivity.

A further object is to provide a tri-axial telemetric accelerometer which is no larger than an accelerometer without telemetry.

A still further object is the provision of a telemetric accelerometer in which a substantial part of the seismic mass performs a utilitarian function in addition to sensing acceleration.

To the fulfillment of these and other objects, the invention provides an accelerometer comprising a hollow outer structure having walls with projections extending inwardly and a hollow inner body surrounded by said outer structure. The inner body has wall portions supporting pressure-sensitive sensors with the sensors respectively engaging the tips of the inwardly-extending projections. A telemetric transmitter is contained within the inner body and includes transducers connecting to sensors and signal transmission means. The inner body forms the seismic mass of the accelerometer.

Other objects of the invention will become apparent upon reading the annexed detailed description in connection with the drawings wherein like parts are designated by like numerals throughout the several views, and wherein.

Figures 1, 2:
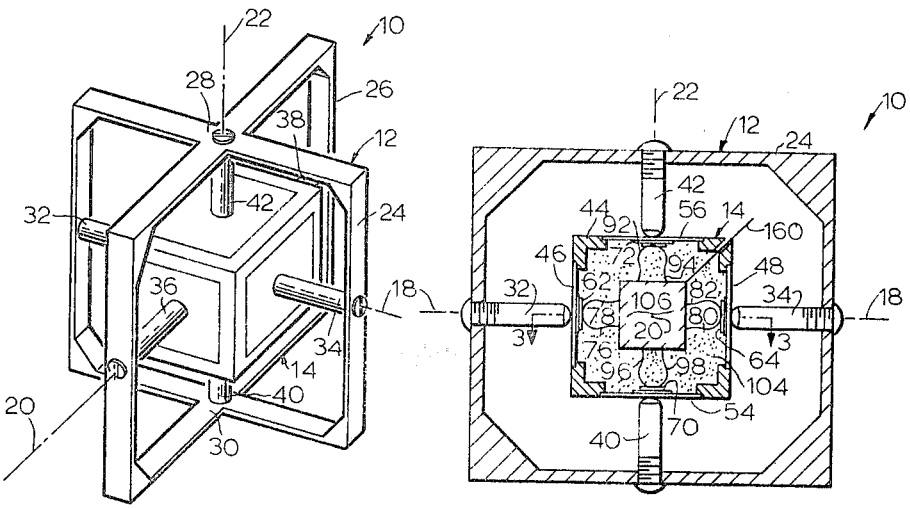
FIG. 1 is a schematic perspective view of a telemetric accelerometer embodying features of the present invention.
FIG. 2 is a sectional view through said accelerometer.
Figure 5:
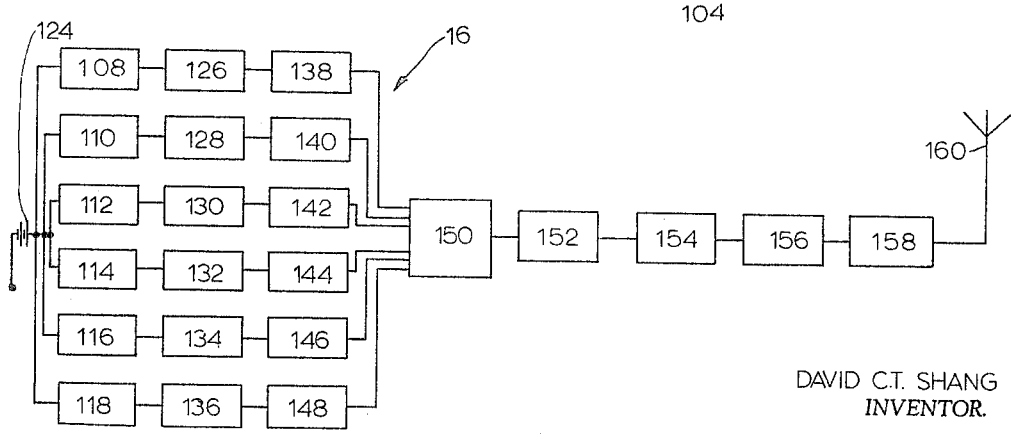
FIG. 5 is a block diagram schematically illustrating the parts of a component of said accelerometer.

Referring to FIG. 1, one embodiment of the present invention is a three-axis accelerometer 10 comprising an outer structure 12 surrounding and supporting an inner body 14, which is the seismic mass of the accelerometer 10. Inner body 14 has a telemetric transmitter 16 (shown in block diagram form in FIGURE 5) for signalling displacement of inner body 14 relative to outer structure 12.

Outer structure 12 has three axes 18, 20, 22 disposed in quadrature. The center of gravity of inner body 14 is located at the intersection of axes 18, 20, 22.

Outer structure 12, which is preferably a skeleton-type framework of cubical configuration, is made up of respective square frames 24 and 26 joined at 28, 30 so as to intersect each other at right angles along axis 22, with each containing a respective one of the other axes 18 and 20. Outer structure 12 is of rigid construction so that deflection or distortion of any of its portions will be minimized when its inner body 14 applies a load thereon.

Outer structure 12 has pins 32, 34, 36, 38, 40, 42, which are preferably stainless steel dowels with outer ends threaded into tapped holes in frames 24, 26 to facilitate assembly and to avoid initial pre-loading, and with anti-friction ball-point tips at their inner ends to make substantially friction-free point contact with adjacent portions of inner body 14. Pins 32, 34 are co-axially spaced and axially adjustable along axis 18 with their outer ends connecting to opposite sides of frame 24. Pins 36, 38 are co-axially spaced and axially adjustable along axis 20 with their outer ends connecting respectively to opposite sides of frame 26. Pins 40, 42 are co-axially spaced and axially adjustable along axis 22 with their axially outer ends connecting respectively to opposite intersections 28, 30 of the frames.

Figures 3, 4:
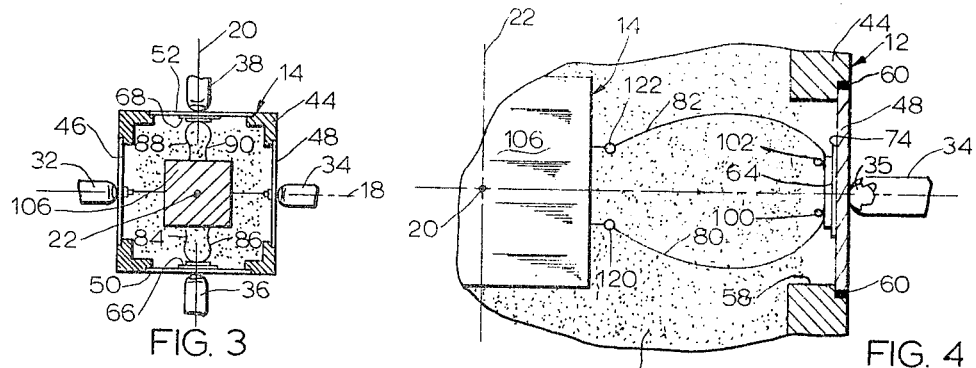
FIG. 3 is a sectional view taken on line 3—3 of FIG. 2 looking in the direction of the arrows.
FIG. 4 is an enlarged view of a portion of FIG. 2.

In FIGURE 4, the typical construction of a pin tip is best illustrated by pin 34 and its ball-point tip 35 which has a single rotatable, bearing ball. With this construction, the pins have a uniform and substantially constant coefficient of friction.

Inner body 14 is preferably a cube-shaped, hollow, housing of aluminum or the like, having a rigid skeleton framework 44 with axially spaced open sides that are arranged in respective planes substantially at right angles to axes 18, 20, 22. The open sides of framework 44 are covered by respective membranes or plates 46, 48, 50, 52, 54, 56, which are preferably stainless steel sheets thin enough to be reasonably flexible for the purposes of the invention as will hereinafter appear. The perimeter portions of the plates overlap and are fastened to the framework members circumscribing the particular openings covered by the plates. For example, in FIG. 4 the perimeter of plate 48 overlaps the framework around opening 58 and is fastened thereto by seal weld 60, or the like.

Plates 46, 48, 50, 52, 54, 56 have respective integral sensor portions 62, 64, 66, 68, 70, 72, which are preferably of the piezo-resistive type, e.g., carbon strain-gauges, or the like; the sensor portions are mounted on the respective axially inner faces of said plates. For example, in FIG. 4, strain gauge 64 has one side bonded by suitable adhesive 74 to the inner face of plate 48. Such composite, beam-like, strain gauge and plate members act in a known manner to provide an electrical resistance, which varies with the transverse pin load thereon that measures a component of the instrument acceleration force.

Sensor gauges 62, 64, 66, 68, 70, 72 have respective pairs of electrical leads 76 and 78; 80 and 82; 84 and 86; 88 and 90; 92 and 94; 96 and 98. Each strain gauge has a pair of terminals disposed at opposite ends thereof respectively connecting to its pair of leads. For example, in FIG. 4, strain gauge 64 has a pair of terminals 100, 102 respectively connecting to its pair of leads 80, 82.

Transmitter 16 (not shown in FIGS. 1–4) is a miniaturized unit that is disposed or packaged in a container 106, that is embedded in a potting material 104 such as epoxy, or the like, which fills the inside of inner body 14. Transmitter 16 (FIG. 5) has transducers 108, 110, 112, 114, 116, 118, disposed inside container 106, and which connect to their respective gauges 62, 64, 66, 68, 70, 72 (FIGS. 2, 3, 4). Each said transducer 108, 110, 112, 114, 116, 118 preferably has a bridge circuit (not shown), or the like; and has terminals with leads connecting to its respective gauge 62, 64, 66, 68, 70, 72, which acts as a variable resistance in such bridge circuit. For example, in FIG. 4, terminals 120, 122 which are disposed on container 106 and which are part of transducer 110 (FIG.

5) are respectively connected to leads 80, 82 of sensor 64.

Transmitter 16 (FIG. 5), as assembled, has a power supply, such as a solar cell battery 124, or the like, which is connected to each of transducers 108, 110, 112, 114, 116, 118, individually. Transducers 108, 110, 112, 114, 116, 118 are respectively connected to signal conditioners 126, 128, 130, 132, 134, 136, which are respectively connected to subcarrier oscillators 138, 140, 142, 144, 146, 148.

Transmitter 16 (FIG. 5) also has an adder 150 which is connected to each of oscillators 138, 140, 142, 144, 146, 148 individually. Adder 150 is operatively connected to an amplifier 152, which is sequentially connected to a modulator 154, an R.-F. transmitter 156, an R.-F. amplifier 158, and a transmitting antenna 160. Antenna 160 preferably extends through a wall of container 106 and through a wall of inner body 14 for ease of signal transmission.

In operation, the direction or vector angle of the acceleration force determines which transducer is actuated. With this construction, not less than one transducer, and not more than three transducers, can be actuated at one time. For example, if the force vector is directed along one axis, the one transducer, which is compressed, is actuated; if the force vector is in a plane of any two axes and at an angle to each of said two axes, two transducers are actuated; and if the force vector is at an angle to each of the three axes, three transducers are actuated. Thus, the direction and amount of the acceleration force can be determined.

In addition, frictional resistance occurs when more than one transducer is actuated. For example, when at least two transducers are actuated at the one time, the vector component of the acceleration force acting against one transducer is lessened by the friction forces of the other vector components of the force acting against the other transducers. With the construction according to the invention, each friction force is a substantially constant percentage of its normal force so that the friction forces are known. Thus, the vector components of the acceleration force can be easily corrected to eliminate the effects of friction.

With this construction, all parts of transmitter 16 contribute to the accelerometer seismic mass whereby the ratio of this seismic mass to the total instrument weight of accelerometer 10 is higher than in prior art accelerometers of this type. Moreover, with an accelerometer of this type, the packaging density can be increased and the overall size of accelerometer 10 can be decreased relative to that of prior art accelerometers.

While the present invention has been described in a preferred embodiment, it will be obvious to those skilled in the art that various modifications can be made therein within the scope of the invention; and it is intended that the appended claims cover all such modifications.

What is claimed is:
1. A telemetric tri-axial accelerometer, comprising:
a frame structure;
a hollow body of cubic configuration disposed within said frame structure;
three pairs of elongate support members extending inwardly from said structure, the members of each pair being coaxially aligned to define one of three orthogonally related axes, the inner ends of said members making substantially point contact with the center of a respective face of said cubic body;
three pairs of transducers mounted on said body with pressure-sensitive portions respectively forming the center portion of the faces of said body; and
telemetric transmitter means contained within said body electrically connected to said transducers whereby said body, said transducers and said transmitter means form the seismic mass of the accelerometer and said transducers generate signals proportional to the coaxial vector components of each acceleration force acting on said seismic mass.

2. A telemetric tri-axial accelerometer as claimed in claim 1 in which said frame structure is a rigid framework of two mutually-perpendicular, four-sided, interconnected rigid frames.

3. A telemetric tri-axial accelerometer as claimed in claim 1 in which said support members are axially adjustable for pre-loading said inner body.

4. A telemetric tri-axial accelerometer as claimed in claim 3 in which said support members have tips with anti-friction bearing means.

5. A telemetric tri-axial accelerometer as claimed in claim 1 in which said hollow body is a housing with a rigid framework and with flexible wall plates integrally supporting said transducers, and said housing contains potting material for embedding said transmitter means.

6. A telemetric tri-axial accelerometer as claimed in claim 5 in which said hollow body, said transducers and said transmitter means have a common center of gravity located at the intersection of said three axes.

7. A telemetric tri-axial accelerometer as claimed in claim 1 in which said pressure-sensitive portions of said transducers have piezo-resistive elements.

8. A telemetric tri-axial accelerometer as claimed in claim 7 in which said pressure-sensitive portions of said transducers are strain gauges with integral beam-like support plates.

9. A telemetric tri-axial accelerometer as claimed in claim 1 in which said transmitter means includes a power supply, transducers, signal conditioners, subcarrier oscillators, an adder, an amplifier, a modulator, an R.-F. transmitter, an R.-F. amplifier and an antenna.

10. A telemetric tri-axial accelerometer as claimed in claim 9 in which there are six transducers individually connected to said power supply.

11. A telemetric tri-axial accelerometer as claimed in claim 9 in which said antenna extends through adjacent portions of said hollow body and said frame structure.

12. A telemetric tri-axial accelerometer as claimed in claim 9 in which said power supply is a solar-cell battery.

References Cited by the Examiner

UNITED STATES PATENTS 2,371,626  3/1945  Kecskemeti _____ 73—517 X

FOREIGN PATENTS 236,044  5/1945  Switzerland.

OTHER REFERENCES

An article entitled "New Method of Measuring Mechanical Vibrations," by Werner from "Instruments," March, 1942, pages 84–87 and 94, page 86. (Copy in 73–71, Group 430).

RICHARD C. QUIESSER, *Primary Examiner.*

JAMES J. GILL, *Examiner.*